US008527613B2

(12) United States Patent
Malone et al.

(10) Patent No.: US 8,527,613 B2
(45) Date of Patent: Sep. 3, 2013

(54) PROVISIONED FIRMWARE UPDATES USING OBJECT IDENTIFIERS

(75) Inventors: Michael William Malone, Boulder, CO (US); Yoong-Goog Cho, Fort Collins, CO (US); Thad Smith, Boulder, CO (US); Ryan Milbrandt, Lakewood, CO (US)

(73) Assignee: Assa Abloy AB, Stockholm (SE)

( * ) Notice: Subject to any disclaimer, the term of this patent is extended or adjusted under 35 U.S.C. 154(b) by 729 days.

(21) Appl. No.: 12/693,654

(22) Filed: Jan. 26, 2010

(65) Prior Publication Data

US 2010/0191951 A1 Jul. 29, 2010

Related U.S. Application Data

(60) Provisional application No. 61/147,385, filed on Jan. 26, 2009.

(51) Int. Cl.
*G06F 15/177* (2006.01)

(52) U.S. Cl.
USPC .......................... 709/220; 709/222; 709/223

(58) Field of Classification Search
None
See application file for complete search history.

(56) References Cited

U.S. PATENT DOCUMENTS

| | | | |
|---|---|---|---|
| 4,658,250 A * | 4/1987 | Nering et al. ................. | 370/462 |
| 6,359,894 B1 | 3/2002 | Hong et al. | |
| 2005/0202808 A1 | 9/2005 | Fishman et al. | |
| 2007/0192532 A1 | 8/2007 | Ogle | |
| 2007/0294385 A1 * | 12/2007 | Kapadekar et al. ........... | 709/223 |
| 2008/0065816 A1 | 3/2008 | Seo | |
| 2009/0172384 A1 * | 7/2009 | Anson .............................. | 713/2 |

OTHER PUBLICATIONS

"Firmware," from Wikipedia, the free encyclopedia, available at http://en.wikipedia.org/wiki/Firmware, page last modified Jan. 5, 2009, printed Jan. 7, 2009, 3 pages.
"Booting," from Wikipedia, the free encyclopedia, available at http://en.wikipedia.org/wiki/Booting, page last modified Jan. 7, 2009, printed Jan. 7, 2009, 10 pages.
Mitchell, B., "Firmware Updates for Wireless Routers," About.com Wireless/Networking, available at http://compnetworking.about.com/od/wifihomenetworking/qt/firmwareupgrade.htm, printed Jan. 7, 2009, 2 pages.
International Search Report for International (PCT) Patent Application No. PCT/US10/22046, mailed Mar. 2, 2010.
Written Opinion for International (PCT) Patent Application No. PCT/US10/22046, mailed Mar. 2, 2010.
International Preliminary Report on Patentability for International (PCT) Patent Application No. PCT/US2010/022046, mailed Aug. 4, 2011 7 pages.
Search Report for European Patent Application No. 10733989.7, dated Jul. 4, 2012 5 pages.

* cited by examiner

*Primary Examiner* — Firmin Backer
*Assistant Examiner* — Keyvan Emdadi
(74) *Attorney, Agent, or Firm* — Sheridan Ross P.C.

(57) ABSTRACT

Methods, devices, and systems are provided for remotely updating provisioning data in devices or a population of devices. An update message is generated that includes an Object Identifier (OID) that uniquely identifies eligible devices or components for the provisioning data update. If an eligible device receives the update message, then the new provisioning data is loaded on the device, thereby replacing the old provisioning data on the device.

32 Claims, 5 Drawing Sheets

PROVISIONED FIRMWARE UPDATES USING OBJECT IDENTIFIERS

CROSS-REFERENCE TO RELATED APPLICATIONS

This application claims the benefit of U.S. Provisional Application No. 61/147,385, filed Jan. 26, 2009, the entire disclosure of which is hereby incorporated herein by reference.

FIELD OF THE INVENTION

The present invention relates generally to update methods, systems, and devices.

More specifically, the present invention is directed toward a unique solution to controlling firmware updates, configuration data updates, and/or key updates in various devices.

BACKGROUND

Firmware is a term used to refer to programs that internally control electronic devices. Virtually every electronic device has some type of firmware included therein. Although there is no strict boundary between where firmware ends and software begins (i.e., definitions of both terms are somewhat loose), it is generally accepted that firmware is involved with controlling the basic and/or low-level operations of an electronic device and is typically, although not exclusively, utilized in electronic devices with no mass-storage device. Without firmware, many electronic devices would not function.

Firmware has evolved to mean almost any programmable content of a hardware device. As used herein, the term "firmware" is understood to mean almost any programmable content of a hardware device and may include, but is not limited to, machine code for a microprocessor, data for application-specific integrated circuits, data for programmable logic devices, and the like. Simple firmware often times resides in Read Only Memory (ROM), while more complex firmware may be stored on flash memory to allow for updates. There may be many reasons to update just a portion of firmware or an entire instance of firmware. For instance, firmware updates may be desired or necessary if a bug is found in the firmware (e.g., a patch needs to be added to the existing firmware) or if new features are to be added to the firmware.

Updating firmware usually involves loading a binary image file provided by the vendor or manufacturer of the electronic device, according to a specific procedure, and may require a user to be present at the device being updated. The traditional firmware upgrade process typically begins by downloading a binary file using specialized equipment from the device manufacturer. After the firmware has been received with no communication errors and locally stored, an administrator can launch the actual upgrade package. As can be appreciated, there are many inefficiencies in current firmware update methods. Additionally, and especially in the case of products that are sold in which different features are only available on certain devices as well as having different costs to the owner of the device, there needs to be a mechanism to efficiently handle these scenarios. There are currently very few mechanisms in place to prohibit this type of action and those mechanisms which are available have a substantial code size footprint. In other words, the analyzer mechanism that determines whether a device is allowed to receive a particular firmware update can take up a significant amount of memory space because it has to store privilege tables and contain verification and authentication algorithms.

SUMMARY

These and other needs are addressed by embodiments of the present invention. More specifically, the present invention provides mechanisms for updating provisioning data in electronic devices in an efficient manner.

In accordance with at least some embodiments of the present invention, the term "provisioning data" is understood to include one or more of firmware, configuration data, and security data (e.g., keys, random number seeds, hashes, etc.).

Firmware, as discussed above, is a generally broad term which may be thought of as encompassing almost any programmable content of a hardware device and may include, but is not limited to, machine code for a microprocessor, data for application-specific integrated circuits, data for programmable logic devices, and the like. Firmware is usually updated by loading a firmware image on an electronic device.

Configuration data may include any type of data used to configure or administer the operations of an electronic device. Examples of configuration data include, without limitation, device operational settings (e.g., parameters controlling device responses to certain types of defined inputs), power management settings (e.g., parameters controlling when a device should be awake or asleep), and the like.

Security data, as noted above, may include any type of data used to secure the electronic device or to secure communications between the electronic device and another device. Examples of security data include, without limitation, keys, random number seeds, hashes, encryption algorithms, and the like.

Additionally, the present invention provides mechanisms for remotely updating provisioning data while accurately limiting the updates to authorized devices. In accordance with at least some embodiments of the present invention, a method of updating provisioning data is provided, the method generally comprising:

receiving, from a requestor, an update request;

generating an update file that includes the necessary updated or new provisioning data as well as an object identifier which identifies an object (device, application, or module) authorized to receive the update file; and transmitting the update file to the requestor.

The update file may be transmitted to the requestor via a communication network or even by "sneaker net" in which the data is contained on machine-readable devices such as RFID cards, thereby enabling remote provisioning data updates.

The requestor, in accordance with at least some embodiments of the present invention, may correspond to an electronic device or devices. The update file does not necessarily need to be transmitted back to the device that submitted the request but can instead by transmitted to whichever device is identified as a desired recipient of the update file. For example, a system administrator may request a provisioning data update for a number of different devices and identify those devices as a "requestor." The update file may be sent to each of the identified requestors rather than, or in addition to, being sent back to the system administrator.

As used herein, an object identifier or OID includes is an identifier used to name an object. Structurally, an OID consists of a node in a hierarchically-assigned namespace, formally defined using standards defined by the Telecommunication Standardization Sector of the International Telecommunication Union (ITU-T) and Abstract Syntax Notation One (ASN.1). Successive numbers of the nodes, starting at the root of the tree, identify each node in the tree. Designers are allowed to set up new nodes by registering them under the node's registration authority. An OID generally comprises multiple components or bytes, with each component defining its associated object with a different level of specificity. It should be appreciated that other types of identifiers may also be used in connection with firmware updates in accordance with at least some embodiments of the present invention. Examples of such identifies include, but are not limited to, Globally Unique Identifier (GUID), a Universal Resource Identifier (URI), or any other type of identifier used in a known or yet to be developed identification scheme.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary access control system. Although well suited for use with, e.g., a system using access control readers and/or credentials, the invention is not limited to use with any particular type of access control system or configuration of system elements. Those skilled in the art will recognize that the disclosed techniques may be used in any data messaging application in which it is desirable to remotely update provisioning data in devices in a controlled fashion.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Although various embodiments of the present invention will be described below in connection with updating firmware on an electronic device, one skilled in the art will appreciate that embodiments of the present invention are generally applicable to updating any type of provisioning data. Thus, the mechanisms and methods discussed in connection with performing a firmware update can be applied to updating any other type of provisioning data (e.g., configuration data, security data, etc.) in a similar manner without departing from the scope of the present invention.

Figure 1:
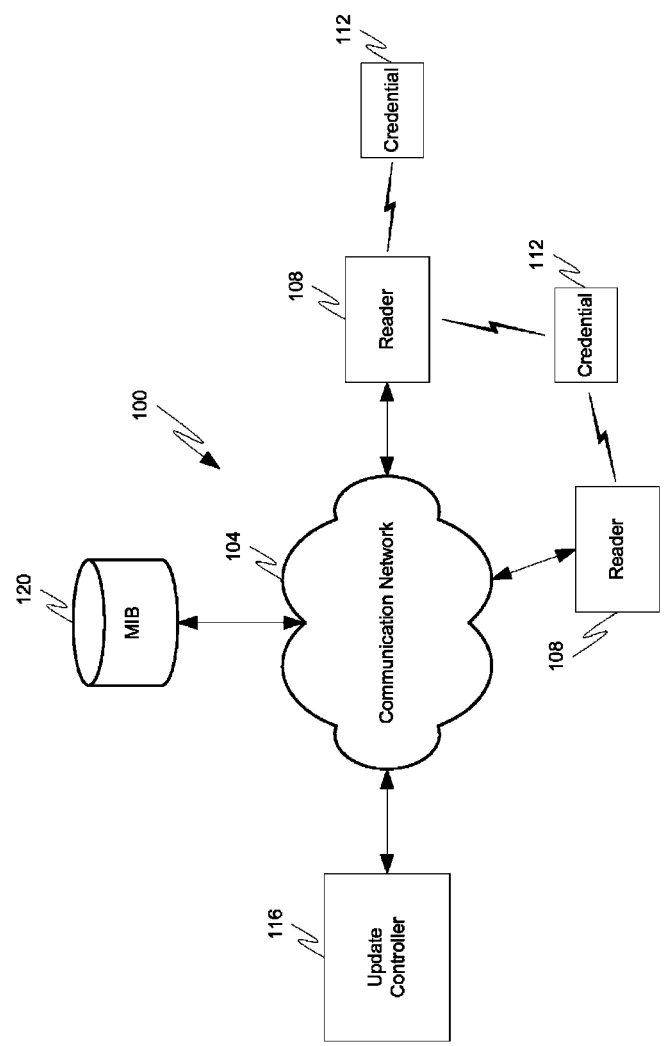
FIG. 1 depicts an access control system in accordance with embodiments of the present invention.

Referring initially to FIG. 1, details of a secure access system 100 are depicted in accordance with at least some embodiments of the present invention. The secure access system 100 generally includes a communication network 104 that connects one or more readers 108 to an update controller 116 and/or Management Information Base (MIB) 120. The readers 108 may also be adapted to communicate with credentials 112 via contactless and/or contact-based communication protocols. Examples of communication protocols employed by the reader 108 to communication with a credential 112 include, without limitation, RF-based communications (e.g., ISO 14443A, ISO14443B, ISO 15693, Near Field Communications, Bluetooth, Zigbee, WiFi, and any other type of communication protocol that utilizes an RF field at 125 kHz or 13.56 MHz, for example), magnetic-based communications, light-based communications, wire-based communications including ISO 7816, $I^2C$, SPI, as well as other known or yet to be developed communication protocols.

In accordance with at least some embodiments of the present invention, the communication network 104 is adapted to carry messages between the components connected thereto. Thus, an update controller 116 is allowed to send messages to and receive messages from a reader 108 and/or MIB 120 via the communication network 104. The communication network 104 may comprise any type of known communication network including wired and wireless or combinations of communication networks and may span long or small distances. The protocols used by the communication network 104 to facilitate controller 116/reader 108 communications may include, but is not limited to, the TCP/IP protocol, Simple Network Management Protocol (SNMP), Power of Ethernet (POE), Wiegand Protocol, RS 232, RS 485, Current Loop, Bluetooth, Zigbee, GSM, SMS, WiFi, and combinations thereof.

One function of a reader 108 is to control access to certain assets (logical and/or physical). More specifically, a reader 108 may be positioned at an access point for a given asset (e.g., a door for a room, building, or safe, a computer for electronic files, and so on). Unless a proper credential 112 is presented to the reader 108, the access point is maintained in a secure state such that admittance or access to the asset is denied. If a credential 112 having authority to access the asset is presented to the reader 108, then the reader 108 has the discretion to allow the user or holder of the credential 112 access to the asset and implement various actions accordingly.

Of course, the reader 108 may comprise additional functionality and such additional functionality will be dependent upon the types of credentials 112 used, the communication network 104, and other design considerations. In accordance with at least one embodiment of the present invention, an instruction set (e.g., firmware, configuration data, and/or security data) is resident on the reader 108 to support and control the functions of the reader 108.

The update controller 116 may be adapted to, at various points in time, update the provisioning data of the reader 108 with new provisioning data (i.e., to fix a bug, provide an update patch, upgrade reader 108 functionality, downgrade reader 108 functionality, and/or remove reader 108 functionality). The update controller 116 may be adapted to provision these updates in connection with information stored in the MIB 120. More specifically, the MIB 120 stores unique Object Identifiers (OIDs) that are assigned to each object in the system 100. As can be appreciated by one skilled in the art, each device in the system 100 (e.g., reader 108, credential 112, as well as other electronic devices) may have more than one OID associated therewith. For example, a multi-technology reader 108 (i.e., a reader 108 that communicates with credentials 112 via two or more communication protocols or at two different frequencies, such as 125 kHz and 13.56 MHz) may comprise several versions of firmware for controlling different functions of the reader 108. As another example, a reader 108 may comprise functionality that allows it to write data to a credential 112 in addition to reading data therefrom.

As a part of facilitating provisioning data updates, the update controller 116 may also manage keys that are used by the reader 108 and credential 112 during user authentication. These keys may be distributed to readers 108 via the communication network 104 or may be hard-coded in the reader 108 during its manufacture.

As noted above, each object referenced in the MIB 120 is assigned a unique OID. In accordance with at least some embodiments of the present invention, these OIDs are defined as a string of numbers representing nodes in a tree structure. The terminating point of any branch (which may also be referred to as a "leaf") fully identifies an object. Leafs in an MIB tree indicate capability and other information relevant to that leaf. The OIDs used in accordance with at least some embodiments of the present invention may be registered as a series of bytes, each byte being separated by a delimiter such as a period or the like. Text strings can also be used to describe unique OIDs. Other well known data types that essentially provide similar functionality using a hierarchically-assigned namespace in which successive numbers of the nodes, starting at the root of the tree, identify each node in the tree include Uniform Resource Locators (URL), Uniform Resource Names (URN), Uniform Resource Identifiers (URI), Uniform Resource Characteristics (URC), Globally Unique Identifiers (GUID), Universal Unique Identifier (UUID) among others. An entity may be assigned a particular number by the Internet Assigned Numbers Authority (IANA), RFC 4122, or others. OIDs are described in further detail below and in connection with FIG. 3.

Figure 2:
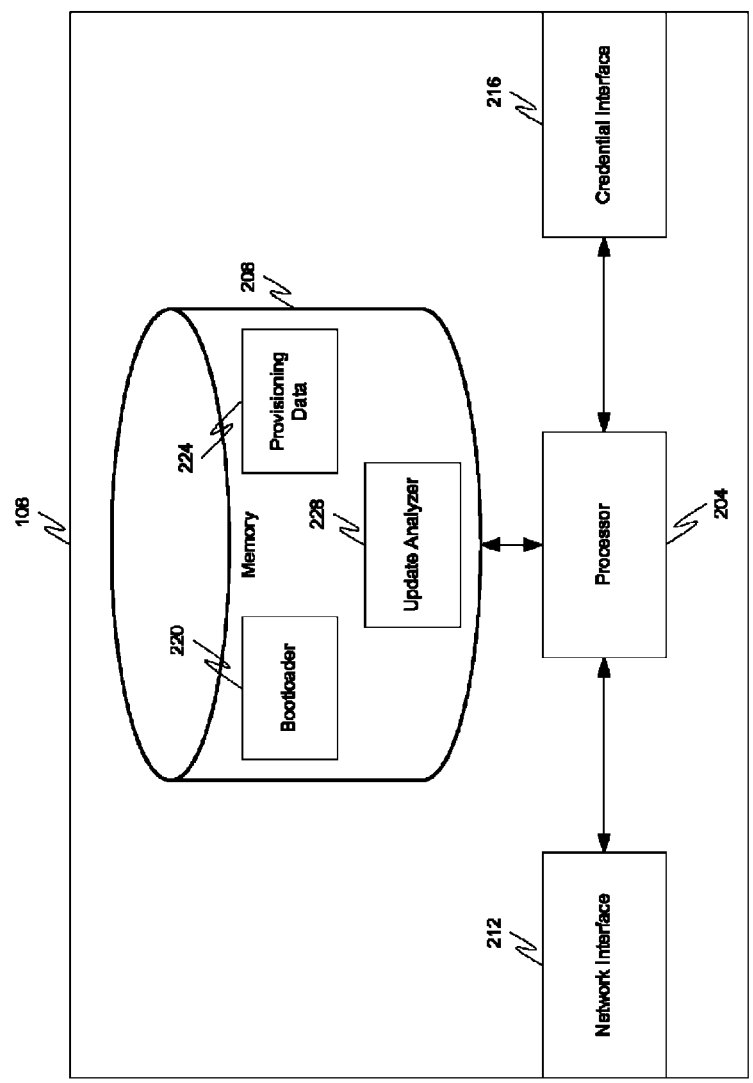
FIG. 2 depicts components of a reader in accordance with embodiments of the present invention.

With reference now to FIG. 2, details of an exemplary reader 108 will be described in accordance with at least some embodiments of the present invention. The reader 108 generally comprises the capability to automatically read data, typically in the form of a message object and/or validation information, from a credential 112. The reader 108 may also be capable of writing data, typically in the form of a message object, back to the credential 112.

The reader 108, in accordance with at least one embodiment, comprises a credential communication interface 216 used to communicate back and forth with the credential 112. The credential communication interface 216 may comprise an RF communication interface (e.g., an RF antenna), a magnetic communication interface (e.g., a magnetic stripe reader), an optical communication interface (e.g., an infrared detector and transmitter), an electrical contact communication interface, or any other means of communicating information to/from a credential 112.

Connected to the communication interface 216 is a controller or processor 204. In one embodiment, the processor 204 includes a microprocessor, a random number generator, and a cryptographic coprocessor. The processor 204 is capable of properly modulating/demodulating data sent to and received from external devices such as the credential 112.

The processor 204 controls and determines how the reader 108 behaves when a credential 112 is presented to it. The processor 204 may include any general-purpose programmable processor, digital signal processor (DSP) or controller for executing application programming. Alternatively, the processor 204 may comprise a specially configured Application Specific Integrated Circuit (ASIC).

The processor 204 may also be provided with control circuitry capable of manipulating an access control device. The access control device is designed to secure a point of access being protected by the reader 108. The processor 204 is enabled to communicate with the access control device via a network interface 212 or via some other dedicated access control interface. Examples of a typical access control device include, without limitation, an electronic lock, a magnetic lock, or an electric strike for a door, a lock for a computer system, a lock for a database, a lock on a financial account, or a lock on a computer application. In one embodiment, the processor 204 actuates the access control device by sending a signal to the access control device via the network interface 212 based on results of an access decision made by the processor 204. Optionally, the access control device may be integral to the reader 108 in one embodiment, in which case an access control device interface would not be necessary. In an alternative embodiment, an access control device is external to the reader 108, thus necessitating some sort of interface between the reader 108 and access control device. Examples of an access control device interface include any type of data port such as a USB port, serial data port, parallel data port, a convention wire, a wireless communication port such as a Bluetooth data interface, an Ethernet port, or any other type of wired or wireless communication interface.

The network interface 212 is also used to connect the reader 108 to the communication network 104. Accordingly, communication packets (perhaps in the form of IP packets of SNMP packets) or messages sent by the update controller 116 to the reader 108 are received initially by the reader 108 at the network interface 212. These messages may be forwarded to the processor 204 for further analysis and processing. The network interface 212 provides communication capabilities between the reader 108 and external servers or other network nodes. Such a communication interface may include a USB port, a wired modem, a wireless modem, a network adapter such as an Ethernet card and Ethernet port, a serial data port, a parallel data port, or any other communication adapter or port known in the art. Of course, the network interface 212 may actually be embodied as multiple network interfaces, for facilitating communications with multiple network types, possibly via different communication protocols.

The reader 108 may further comprise a memory 208. The memory 208 may be used to store firmware that supports functionality of the reader 108. More specifically, the memory 208 may comprise provisioning data 224 in the form of firmware, configuration data, and/or security data that can be executed by the processor 204, thereby allowing the reader 108 to operate as desired. In addition to provisioning data 224 or similar instruction sets (e.g., software), the memory 208 may also be used to store a boot loader application 220 as well as an update analyzer 228.

The boot loader application 220 is used by the reader 108 to load new provisioning data in memory 208 (e.g., replace, update, upgrade, or downgrade provisioning data 224 with new provisioning data). The update analyzer 228, on the other hand, is used to analyze whether new provisioning data received at the reader 108 is allowed to be loaded in memory 208. As will be discussed in further detail below, the update analyzer 228 is used to extract an OID from an update file (which contains the new provisioning data) and compare that OID with an OID currently associated with the reader 108 or components of the reader 108, such as the provisioning data 224 platform, behavior, and/or variant. If the update analyzer 228 determines that the reader 108 is eligible to receive the new provisioning data, then the update analyzer 228 may allow the new provisioning data to be passed to the boot loader 220 for replacing all or part of the old provisioning data 224.

The memory 208 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 208 and the processor 204 are designed to utilize known security features to prevent unauthorized access to the contents of the memory 208 such as side channel analysis and the like.

A power source (not depicted) may also be included in the reader 108 to provide power to the various devices contained within the reader 108. The power source may comprise internal batteries and/or an AC-DC converter such as a switch mode power supply or voltage regulator connected to an external AC power source.

Figure 3:
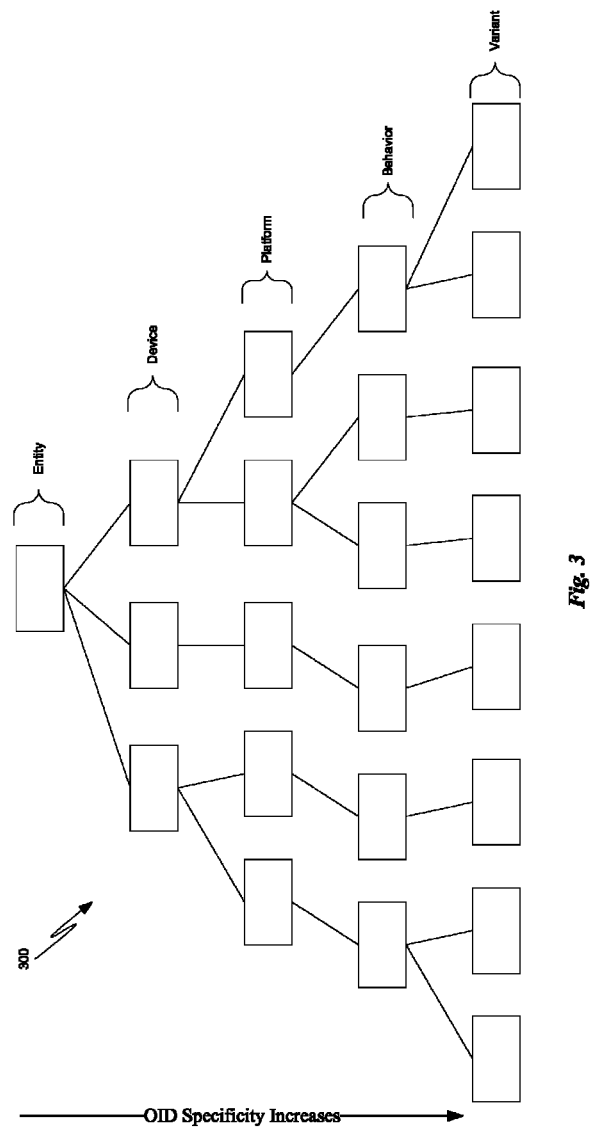
FIG. 3 depicts a data structure used to control provisioning data updates in accordance with embodiments of the present invention.

Referring now to FIG. 3, further details of a data structure 300 used in accordance with at least some embodiments of the present invention will be described. The data structure 300 may correspond to an MIB tree, some or all of which may be stored in the MIB 120, in memory 208 of an electronic device, at the update controller 116, or in combinations thereof. As noted above, an entity has the possibility of being assigned an OID starting with the originating ISO node and ending with the number assigned by IANA. As an example, assume that a company is assigned the number 12345 by IANA. An OID for that company may begin with the ISO node and end with the number assigned to the company according to the following:

iso.org.dod.internet.private.enterprises.company

Each field above may be assigned a number or byte and may be separated by periods or some other character or symbol so that same OID can be defined numerically, for example, as:

1.3.6.1.4.12345

All subclasses of devices, services, or the like within that company can be defined by the company. For instance, a company may assign devices produced by the company the following numbers:

Product Group 1 (1)
Device 1 for Product Group 1 (1)
Device 2 for Product Group 1 (2)
Firmware 1 for Device 1 (1)
Firmware 2 for Device 1 (2)
Firmware 1 for Device 2 (3)
Platform 1 for Firmware 1 (1)
Platform 2 for Firmware 1 (2)
Platform 3 for Firmware 1 (3)
Platform 4 for Firmware 1 (4)
Behavior 1 for Platform 1 (1)
Behavior 2 for Platform 1 (2)
Variant 1 for Platform 1 (1)
Variant 2 for Platform 1 (2)
MajorVersion 1 for Variant 1 (1)
MajorVersion 2 for Variant 1 (2)
.
.
.
MinorVersion 1 for Variant 1 (1)
MinorVersion 2 for Variant 1 (2)
.
.
.
Etc.

The company can then specify a specific provisioning data update and limit the update to products that have a particular platform, behavior, variant, version, etc. In accordance with at least some embodiments of the present invention, the OID may end with a predetermined character or string (e.g., zero or 0.0), such that the end of an OID can be easily and quickly identified.

Control over the provisioning data update is achieved by utilizing an OID that identifies which devices or objects are allowed to be updated with the provisioning data. If the OID associated with a provisioning data update specifies an eligible object down to the variant level of specificity, then only an object having an OID that matches the OID associated with the provisioning data update down to the variant level of specificity will be allowed to receive the firmware update. In this example, objects with different major or minor versions of the variant will be allowed to receive the firmware update as long as their variant type is the same (i.e., the OID matches down to the variant level of specificity).

In another example, if a provisioning data update is authorized for all products within an entity, then the OID that is associated with the provisioning data update would only define the entity and device that are allowed to receive the provisioning data update. Any device that has the same OID at the entity and device level would be authorized to receive the provisioning data update. No additional analysis of the object's platform, behavior, and/or variant would be required since the OID does not define any restrictions with respect to those levels of specificity. Some embodiments may accomplish via means of a length comparison, whereas other embodiments may use a mask or an arithmetic comparison alone or in combination with a length comparison.

If a full OID is used in the above example, then the last 5 bytes (each byte corresponding to a different node in the MIB tree), describe the object (provisioning data in this example) down to the version number. This allows the update controller 116 to restrict firmware updates with an OID based on the versions that have been authorized for a provisioning data update. Accordingly, various levels of control over a provisioning data update can be exercised by controlling the OID and selectively determining how much, if at all, the OID should be truncated.

Therefore, and in accordance with at least some embodiments of the present invention, an OID is used to identify the provisioning data or instruction set to be loaded into an object (e.g., a reader 108). Moreover, the OID is used to control permissions for loading the new provisioning data. If an OID is truncated at a particular level (e.g., the variant level), the boot loader 220 is, in effect, only allowed to write the new provisioning data that is currently configured to the particular variant. This determination is made by the update analyzer 228. Any reader 108 not configured with the specified variant will reject the provisioning data boot load. Permission resolution can be further controlled by truncating the OID further (e.g., down to the platform level). This would indicate to the reader 108 that the new provisioning data is allowed in any reader 108 with the specified hardware platform, regardless of it's current behavior/variant configuration. This provides an efficient mechanism for controlling provisioning data distribution without the need for additional code and identifying data to analyze the "appropriateness" of the provisioning data about to be boot loaded.

In some embodiments it may be possible to define certain leaves of the data structure 300 based on some criteria other than device type, platform, behavior, and variant. For example, a certain leaf or OID may actually identify a single reader 108 (or similar electronic device). If an OID which substantially uniquely identifies that reader 108 is sent along with a provisioning data update, only that reader 108 identified by the OID would be allowed to perform the provisioning data update. In still other embodiments, it may be possible to define certain leaves or trunks of the data structure 300 based on customers of a particular vendor (e.g., manufacturer of the reader 108). In such embodiments, when a leaf or branch of the data structure 300 is used to define particular customers, a vendor may transmit an update file to all of its customers, but only those customers whose OID match the OID specified in the update file will be allowed to perform the provisioning data update. Other ways in which the data structure 300 can be organized to facilitate the efficient administration of provisioning data updates will be apparent to those skilled in the art based on the current disclosure.

Figure 4:
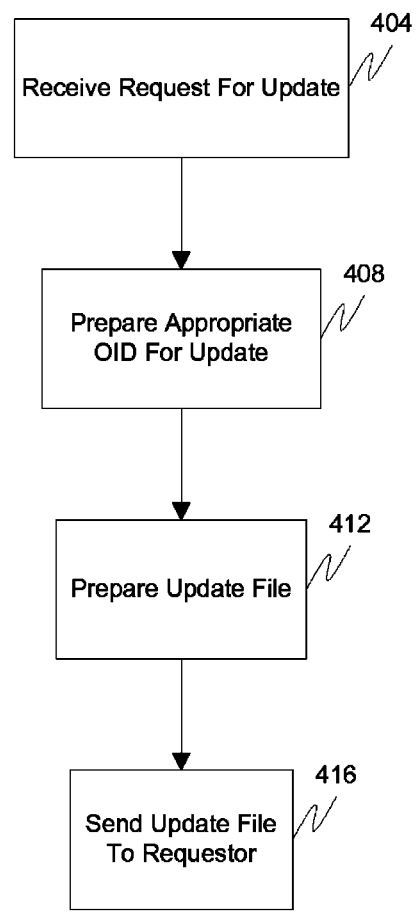
FIG. 4 is a flow chart depicting a method of generating an update file in accordance with embodiments of the present invention.

With reference now to FIG. 4, an exemplary method of preparing an update file in response to an update request will be discussed in accordance with at least some embodiments of the present invention. The method is initiated when a request for a provisioning data update is received at the update controller 116 (step 404). In response to receiving the request, the update controller 116 prepares an appropriate OID for the provisioning data update (step 408). In this step, the update controller 116 determines what objects are allowed to receive the provisioning data update or, conversely, what objects are not allowed to receive the provisioning data update. Based upon this determination, the update controller 116 refers to the MIB 120 to determine what MIB branch should be used and where the OID should be truncated, if at all, so as to properly authorize all of the allowed objects to boot load the provisioning data update while prohibiting the non-allowed objects from boot loading the provisioning data update.

After the OID for the provisioning data update has been prepared, the method continues with the update controller 116 preparing an update file (step 412). The update file, in accordance with at least some embodiments of the present invention, contains the OID as well as the new provisioning data that will replace or supplement existing provisioning data on authorized objects. The update file may comprise a Simple Network Management Protocol (SNMP) file that is capable of being transmitted over the communication network 104 as either a single message or a number of separate messages. Any other type of message may be used to carry OIDs without departing from embodiments of the present invention. SNMP files are but one vehicle which may be used to carry the update file across the communication network 104.

The update file may be secured with a key set that is used as a transport key (i.e., to encrypt the update file when transmitted across the communication network 104). This key or key set may also be used as a signature for the file that allows the file recipient to verify the source of the file as well as decode the file.

Once the update controller 116 has generated the update file, the method continues with the update controller 116 sending the update file to the requestor (step 416). During the sending step, the update controller 116 transmits the update file over the communication network 104 to the requestor. Accordingly, the update controller 116 is capable of remotely updating the provisioning data for any requesting device connected to the communication network 104. Alternatively, if complete remote updating is not desired, the update file may be written to a Smart Card, SIM, hand held card emulator, NFC enabled phone or the like or more specifically a portable computer-readable medium, such as a flash drive, CD-ROM, DVD-ROM, or the like, and physically carried to the requestor, where it is presented to the appropriate objects and the provisioning data is boot loaded (assuming the object is allowed to receive the provisioning data update). Of course, a combination of remote and manual methods of carrying the update file to the requestor may be utilized. For example, part of the update file may be transmitted to the requestor over the communication network 104, while other parts (e.g., an encryption key used by the provisioning data) of the update file may be physically carried. This may allow less sensitive portions of the provisioning data to be transmitted over the communication network 104 while more sensitive portions of the provisioning data are directed around the communication network 104.

Figure 5:
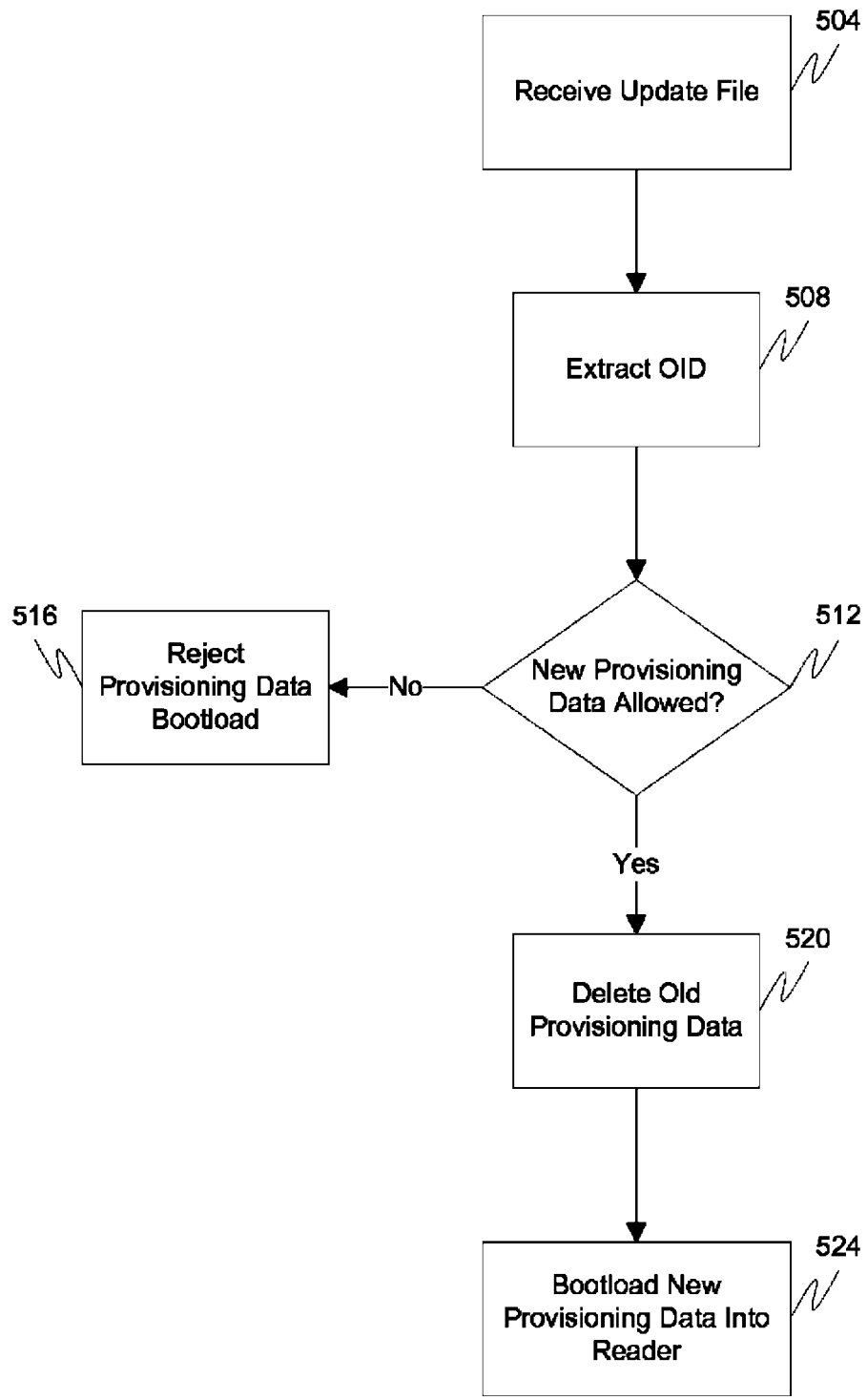
FIG. 5 is a flow chart depicting a method of analyzing and processing an update file in accordance with embodiments of the present invention.

With reference now to FIG. 5, a method of processing a received update file will be described in accordance with at least some embodiments of the present invention. The method is initiated when an update file is received at an electronic device (e.g., reader 108 or any other communication device that employs firmware) (step 504). In accordance with at least some embodiments of the present invention, the update file comprising the new provisioning data may be presented to the electronic device in any number of computer-readable mediums. For instance, the new provisioning data may be stored along with associated OID on a computer-readable medium such as portable memory (e.g., flash drive, CD, DVD, memory on a credential 112 or the like). Alternatively, the provisioning data may be sent over a communication network 104 as electronic signals or messages. The content of these messages may then be stored in another computer-readable medium, such as local memory, where the OID can be analyzed and it is determined whether the object that received the update file is allowed to boot load the provisioning data.

Upon receiving the update file, the electronic device utilizes the update analyzer 228 to extract the OID from the update file (step 508). The OID may comprise any number of bytes, usually depending upon the specificity with which the provisioning data update has been restricted. The OID typically identifies at least an entity and usually a device, although such a minimum identification is not a strict requirement.

Thereafter, the update analyzer 228 analyzes the OID to determine whether the electronic device is allowed to boot load the new provisioning data in the update file (step 512). Generally speaking, when an electronic device is manufactured all of the objects in that electronic device are assigned an OID. If one or more of those objects are updated at any point in time, then the OID may also be updated to reflect the properties of the new object. Accordingly, the update analyzer 228 may compare the received OID the OIDs of any object associated with the electronic device (e.g., resident on the device or supported by the device), such as provisioning data 224 already resident on the device. If any object has an OID that completely satisfies all of the requirements of the OID extracted from the update file, then that object is allowed to boot load the new provisioning data, perhaps replacing older versions of the provisioning data 224. Otherwise, that object is restricted from boot loading the new provisioning data.

In accordance with at least one embodiment of the present invention, an OID of an object associated with an electronic device may satisfy all of the requirements of the OID extracted from the update file if every byte of the OID extracted from the update file is matched by at least a portion of the bytes in the OID of the object associated with the electronic device. As an example, if the OID extracted from the update file has the following fields (entity.device.platform) with the following values (1.3.2), then all of the following OIDs would satisfy this extracted OID if their fields (entity.device.platform.behavior.version) have the following values:

1.3.2.1.1.0
1.3.2.2.1.0
1.3.2.1.0
1.3.2.2.1.0

If the query of step 512 is answered negatively, then the update analyzer 228 will reject the provisioning data boot load and restrict the electronic device from writing the new provisioning data to its memory 208 (step 516). However, if the query of step 512 is answered affirmatively, then the update analyzer 228 will continue by passing the provisioning data contained within the update file to the bootloader 220. At that point the bootloader 220 will delete the old provisioning data 224 (or portions of the old provisioning data 224 which are being replaced/updated) from memory 208 (step 520). During this time, some functionality of the electronic device may not be available. Thereafter, the bootloader 220 is allowed to write the new provisioning data to memory 208 (step 524). The write step may also include updating the OID associated with the provisioning data 224 to reflect that a new provisioning data, possibly having a different variation, behavior, platform, etc. from the old provisioning data has been loaded in memory 208.

Additionally, if further configuration data, security keys, security data, or the like need to be loaded into memory 208, the bootloader 120 may perform this during the boot loading step. Alternatively, if the configuration data, security keys, and/or security data were not included in the update file, it may be necessary for an administrator to visit the electronic device and update the memory 208 with the new keys.

While embodiments of the present invention have been generally described in connection with using an OID to control write behavior, one skilled in the art will appreciate that the invention is not so limited. More specifically, an OID may also be used in connection with controlling read operations.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for remotely updating provisioning data. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving, from a requestor, an update request;
generating an update file that includes provisioning data as well as an object identifier which identifies an object authorized to receive the provisioning data, wherein the object identifier comprises at least five bytes, wherein a first of the at least five bytes uniquely defines an entity associated with the object authorized to receive the provisioning data update, wherein a second of the at least five bytes uniquely defines a subclass of device associated with the entity, wherein a third of the at least five bytes uniquely defines a platform associated with the device, wherein a fourth of the at least five bytes uniquely defines a behavior associated with the platform, and wherein a fifth of the at least five bytes uniquely defines a version associated with the behavior; and
transmitting the update file to the requestor.

2. The method of claim 1, wherein the object authorized to receive the provisioning data update comprises a particular device, platform, behavior, and version and wherein the object identifier comprises an identifier for the particular device, platform, behavior, and version.

3. The method of claim 1, wherein the object authorized to receive the provisioning data update comprises a particular customer and wherein the object identifier comprises an identifier for the particular customer.

4. The method of claim 1, wherein the provisioning data comprises a firmware image.

5. The method of claim 1, wherein provisioning data comprises configuration data.

6. The method of claim 1, wherein provisioning data comprises security data.

7. The method of claim 1, wherein the provisioning data is adapted to be stored in memory of the object authorized to receive the provisioning data update.

8. The method of claim 7, wherein the memory comprises at least one of flash memory, Programmable ROM (PROM), and Electronically Erasable PROM (EEPROM).

9. The method of claim 1, wherein the update file comprises a Simple Network Management Protocol (SNMP) file and wherein transmitting the update file comprises sending the SNMP file to the requestor via a communication network that utilizes the Internet Protocol.

10. The method of claim 1, wherein the first byte defines the object authorized to receive the provisioning data update with a first level of specificity and wherein each subsequent byte defines the object authorized to receive the provisioning data update with a greater level of specificity than the previous byte and a greater level of specificity than the first level.

11. The method of claim 1, wherein the update file is carried to the object authorized to receive the provisioning data update via a wired communication link.

12. The method of claim 1, wherein the update file is carried to the object authorized to receive the provisioning data update via a wireless communication link.

13. The method of claim 1, wherein at least part of the update file is physically carried to the object authorized to receive the provisioning data update via a portable memory device.

14. The method of claim 1, further comprising:
receiving the update file at an electronic device;
extracting the object identifier from the update file; and
determining whether the electronic device is allowed to receive the provisioning data update based on a comparison of the object identifier with an object identifier associated with the electronic device.

15. The method of claim 14, further comprising:
determining that the electronic device comprises an object authorized to receive the provisioning data update;
extracting an updated provisioning data from the update file;
erasing at least a portion of an old provisioning data from memory of the electronic device; and
writing the updated provisioning data to memory of the electronic device.

16. A method, comprising:
receiving an update file;
extracting an object identifier from the update file, wherein the object identifier comprises at least five bytes, wherein a first of the at least five bytes uniquely defines an entity associated with the object authorized to receive the provisioning data update, wherein a second of the at least five bytes uniquely defines a subclass of device associated with the entity, wherein a third of the at least five bytes uniquely defines a platform associated with the device, wherein a fourth of the at least five bytes uniquely defines a behavior associated with the platform, and wherein a fifth of the at least five bytes uniquely defines a version associated with the behavior; and
determining whether an object is allowed to receive a provisioning data update based on the object identifier.

17. The method of claim 16, further comprising:
determining that the electronic device comprises an object authorized to receive the provisioning data update;
extracting an updated provisioning data from the update file;
erasing at least a portion of an old provisioning data from memory of the electronic device; and
writing the updated provisioning data to memory of the electronic device.

18. The method of claim 16, wherein the provisioning data comprises a firmware image.

19. The method of claim 16, wherein provisioning data comprises configuration data.

20. The method of claim 16, wherein provisioning data comprises security data.

21. An electronic device, comprising:
memory that stores at least one version of provisioning data and an object identifier, wherein the object identifier is used to determine whether the at least one version of provisioning data can be replaced with a new version of provisioning data based on a comparison of the object identifier to an object identifier associated with the new version of provisioning data, wherein the object identifier further comprises at least five bytes, wherein a first of the at least five bytes uniquely defines an entity associated with the object authorized to receive the provisioning data update, wherein a second of the at least five bytes uniquely defines a subclass of device associated with the entity, wherein a third of the at least five bytes uniquely defines a platform associated with the device, wherein a fourth of the at least five bytes uniquely defines a behavior associated with the platform, and wherein a fifth of the at least five bytes uniquely defines a version associated with the behavior.

22. The device of claim 21, wherein the provisioning data comprises a firmware image.

23. The device of claim 21, wherein provisioning data comprises configuration data.

24. The device of claim 21, wherein provisioning data comprises security data.

25. A non-transitory computer-readable medium, comprising:
provisioning data; and
an object identifier used to determine whether the provisioning data is allowed to be boot loaded, wherein the object identifier further comprises at least five bytes, wherein a first of the at least five bytes uniquely defines an entity associated with the object authorized to receive the provisioning data update, wherein a second of the at least five bytes uniquely defines a subclass of device associated with the entity, wherein a third of the at least five bytes uniquely defines a platform associated with the device, wherein a fourth of the at least five bytes uniquely defines a behavior associated with the platform, and wherein a fifth of the at least five bytes uniquely defines a version associated with the behavior.

26. The non-transitory computer-readable medium of claim 25, wherein the provisioning data comprises a firmware image.

27. The non-transitory computer-readable medium of claim 25, wherein provisioning data comprises configuration data.

28. The non-transitory computer-readable medium of claim 25, wherein provisioning data comprises security data.

29. The method of claim 1, wherein the second of the at least five bytes is adjacent to at least one of the first and third byte.

30. The method of claim 16, wherein the second of the at least five bytes is adjacent to at least one of the first and third byte.

31. The device of claim 21, wherein the second of the at least five bytes is adjacent to at least one of the first and third byte.

32. The non-transitory computer-readable medium of claim 25, wherein the second of the at least five bytes is adjacent to the third byte.

* * * * *